United States Patent
Arsenlis et al.

(10) Patent No.: US 8,085,894 B2
(45) Date of Patent: Dec. 27, 2011

(54) SWELLING-RESISTANT NUCLEAR FUEL

(75) Inventors: Athanasios Arsenlis, Hayward, CA (US); Joe Satcher, Jr., Patterson, CA (US); Sergei O. Kucheyev, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 279 days.

(21) Appl. No.: 12/101,380

(22) Filed: Apr. 11, 2008

(65) Prior Publication Data

US 2009/0080592 A1 Mar. 26, 2009

Related U.S. Application Data

(60) Provisional application No. 60/925,916, filed on Apr. 23, 2007.

(51) Int. Cl.
*G21C 3/00* (2006.01)

(52) U.S. Cl. .................. 376/411; 376/409; 376/412

(58) Field of Classification Search ............. 376/412, 376/409
See application file for complete search history.

(56) References Cited

U.S. PATENT DOCUMENTS

| | | | | |
|---|---|---|---|---|
| 3,661,709 A | * | 5/1972 | Chubb et al. | 376/409 |
| 3,992,494 A | * | 11/1976 | Holden | 264/0.5 |
| 4,231,976 A | * | 11/1980 | Bischoff et al. | 264/0.5 |
| 4,829,031 A | * | 5/1989 | Roy et al. | 501/134 |
| 6,712,917 B2 | * | 3/2004 | Gash et al. | 149/19.92 |
| 2005/0112389 A1 | * | 5/2005 | Loureiro et al. | 428/472 |

OTHER PUBLICATIONS

Ultramet, "Refractory Open-Cell Foam Fuel Matrix for High-Efficiency Nuclear Space Propulsion Systems", 2002., http://www.spacepda.net/abstracts/02/sttr/020014.html.*
Satcher et al. "Synthesis and characterization of a low-density urania . . . ." J. Non-tryst Solids 319, p. 241-246, 2003.
Mansour et al. "A comparitive in situ X-ray Absorption Spectroscopy Study of Nanophase . . . ." Electrochem. Soc., 2003, v.150, Issue 4, A403-A413.
Gash et al. "Use of Epoxides in the Sol-gel Synthesis of Porous Iron(III) Oxide Monoliths from Fe(III) Salts" Chem. Mater., 2001, 99/1007, v.13.

* cited by examiner

*Primary Examiner* — Rick Palabrica
(74) *Attorney, Agent, or Firm* — Eddie E. Scott

(57) ABSTRACT

A nuclear fuel according to one embodiment includes an assembly of nuclear fuel particles; and continuous open channels defined between at least some of the nuclear fuel particles, wherein the channels are characterized as allowing fission gasses produced in an interior of the assembly to escape from the interior of the assembly to an exterior thereof without causing significant swelling of the assembly. Additional embodiments, including methods, are also presented.

21 Claims, 4 Drawing Sheets

NANOPOROUS SOLID

FIG. 4C
IPN=A+B

FIG. 4B
NETWORK B

FIG. 4A
NETWORK A

SWELLING-RESISTANT NUCLEAR FUEL

RELATED APPLICATIONS

This application claims priority to U.S. Provisional Patent Application Ser. No. 60/925,916, filed Apr. 23, 2007, and which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to nuclear fuel, and more particularly, this invention relates to a nuclear fuel that resists swelling, and methods for making the same.

BACKGROUND OF THE INVENTION

For use as nuclear fuel, enriched uranium hexafluoride is converted into uranium dioxide ($UO_2$) powder that is then processed into pellet form. The pellets are then fired in a high temperature sintering furnace to create hard, ceramic pellets of enriched uranium. The cylindrical pellets then undergo a grinding process to achieve a uniform pellet size. The pellets are stacked, according to each nuclear reactor core's design specifications, into tubes of corrosion-resistant metal alloy, called cladding. The tubes are sealed to contain the fuel pellets; these tubes are called fuel rods.

Nuclear fuel swelling of Uranium Dioxide-based fuels (and possibly other nuclear fuels) is a life limiting phenomenon controlling the residence of nuclear fuel assemblies in the core of current Light Water Reactors (LWRs).

Current strategies for prolonging the residence time of nuclear fuel assemblies reactor cores consist of leaving a gap between the fuel pellet and the surrounding cladding that the nuclear fuel can expand into, and modifying the oxygen content away from stoichometric ratios to help control the rate of swelling.

SUMMARY OF THE INVENTION

A nuclear fuel according to one embodiment comprises an assembly of nuclear fuel particles; and continuous open channels defined between at least some of the nuclear fuel particles, wherein the channels are characterized as allowing fission gasses produced in an interior of the assembly to escape from the interior of the assembly to an exterior thereof without causing significant swelling of the assembly.

A nuclear fuel according to another embodiment comprises an assembly of nuclear fuel particles having a periphery defining an overall volume of the assembly, the assembly characterized as allowing fission gasses produced in an interior of the assembly to escape from the interior of the assembly to an exterior thereof, wherein the assembly maintains about the same overall volume during a nuclear fission chain reaction involving the nuclear fuel particles thereof.

A method for fabricating a nuclear fuel according to one embodiment comprises consolidating a precursor of a nuclear fuel to produce an open nanoscale porosity material having a density of at least about 68% of a theoretical maximum density of the material.

A method for fabricating a fuel assembly according to one embodiment comprises consolidating nuclear fuel particles under conditions that produce a material in which the fuel particles form nano-scale ligaments and continuous open channels are defined between at least some of the ligaments, wherein the channels are characterized as allowing fission gasses produced in an interior of the assembly to escape from the interior of the material to an exterior thereof without causing significant swelling of the material.

Other aspects, advantages and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of nuclear fuels and methods for making the same.

In one general embodiment, a nuclear fuel comprises an assembly of nuclear fuel particles, and continuous open channels defined between at least some of the nuclear fuel particles. The channels are characterized as allowing fission gasses produced in an interior of the assembly to escape from the interior of the assembly to an exterior thereof without causing significant swelling of the assembly.

In another general embodiment, a nuclear fuel comprises an assembly of nuclear fuel particles having a periphery defining an overall volume of the assembly (i.e., the volume of the assembly as measured along its periphery (outer side(s)), without taking into account any internal porosity of the assembly), the assembly characterized as allowing fission gasses produced in an interior of the assembly to escape from the interior of the assembly to an exterior thereof, where the assembly maintains about the same overall volume during a nuclear fission chain reaction involving the nuclear fuel particles thereof.

In one general embodiment, a method for fabricating a nuclear fuel comprises consolidating a precursor of a nuclear fuel to produce an open nanoscale porosity material having a density of at least about 68% of a theoretical maximum density of the material.

In another general embodiment, a method for fabricating a fuel assembly comprises consolidating nuclear fuel particles under conditions that produce a material in which the fuel particles form nano-scale ligaments and continuous open channels are defined between at least some of the ligaments, where the channels are characterized as allowing fission gasses produced in an interior of the assembly to escape from the interior of the material to an exterior thereof without causing significant swelling of the material.

Particularly preferred embodiments address the problem of fuel swelling by controlling the material microstructure at the nano-scale so as to make a nuclear fuel material that does not significantly swell during fission and requires little or no gap between the fuel and the cladding to allow for expansion. Particularly preferred embodiments exhibit no swelling, and therefore require no gap between the fuel and the cladding to allow for expansion.

Nuclear fuels according to some embodiments described herein may be used in current LWR power reactors and future nuclear reactors as fuel that does not swell and impart mechanical loading on the cladding materials. The fuel form has the potential of significantly increasing the residence time of nuclear fuel in reactor cores and increasing their operating efficiency.

Nuclear fuel is any material that can be consumed to derive nuclear energy. One type of nuclear fuel comprises heavy fissile elements that can be made to undergo nuclear fission chain reactions in a nuclear fission reactor; nuclear fuel can refer to the material or to physical objects (for example fuel bundles composed of fuel rods) composed of the fuel material, perhaps mixed with structural, neutron moderating, or neutron reflecting materials. Illustrative fissile nuclear fuels include $^{235}U$, $^{239}Pu$, thorium, etc.

One particularly preferred nuclear fuel comprises uranium dioxide, which is a black semiconductor solid. It can be made by reacting uranyl nitrate with a base (ammonia) to form a solid (ammonium uranate). It is heated (calcined) to form $U_3O_8$ that can than be converted by heating in an argon/hydrogen mixture (700° C.) to form $UO_2$.

The chemical properties of the fuel or precursor may be similar to those of current fuels used in LWR reactors. However, many embodiments of the fuels and materials processing described herein have or form a different microstructure that is superior to current nuclear fuels, particularly in terms of its swelling characteristics. In particularly preferred embodiments, the microstructure includes interconnected nano-scale ligaments with interconnected nanopores that allow the fission gasses, which otherwise would build up, to escape into the plenum region of the fuel pin and not lead to any swelling. In some processes described herein, a continuous open nanoscale porosity and nanoscale ligament structure is maintained throughout the synthesis and consolidation (and, if necessary, reduction).

One approach to forming a nuclear fuel can be summarized as consolidation of precursor (e.g. $UO_3$ or $U_3O_8$) or final fuel (e.g. $UO_2$) materials to produce a continuous open nanoscale porosity material at about 68% or more of its Theoretical Maximum Density (TMD), preferably with nanoscale ligaments coupling the building blocks together. The nanoscale ligaments may be formed, at least in part, of nuclear fuel particles. Accordingly, the ligaments may include a series of linked particles, or struts, etc. that make up the structural network.

The length of the nanoscale ligaments are preferably selected to form a nuclear fuel material in which fission gasses are allowed to escape from an interior thereof without causing significant swelling of the material. Without wishing to be bound by any theory, the inventors believe that the coupling by nanoscale ligaments creates mean free paths for fission gasses to escape in such a manner that a probability of a fission gas atom encountering another fission gas atom and forming a bubble (which could cause the material to swell) is less than the probability of the atom escaping from the interior of the material.

Nano-scale ligaments may be in the range of about 0.1 nanometer to about 1000 microns, more preferably in the range of about 1 nanometer to about 10 nanometers, even more preferably in the range of about 5±2 nanometers to about 10±2 nanometers. Pore diameters may be in about the same ranges, or higher or lower.

It should be noted that the closer the nuclear fuel is to its TMD, the less enrichment it needs to be a good fuel for typical reactors. Conversely, the more enriched the nuclear fuel raw material is, the lower the percent of TMD is required. That said, about 68% of TMD is based on typical nuclear fuel raw materials, and the actual percentage of TMD selected may be higher or lower than about 68%.

A pictorial representation of potential processing and approaches are depicted in FIGS. 1A-4C, described immediately below, and followed by a description of potential synthesis and consolidation methods.

Figure 1A:
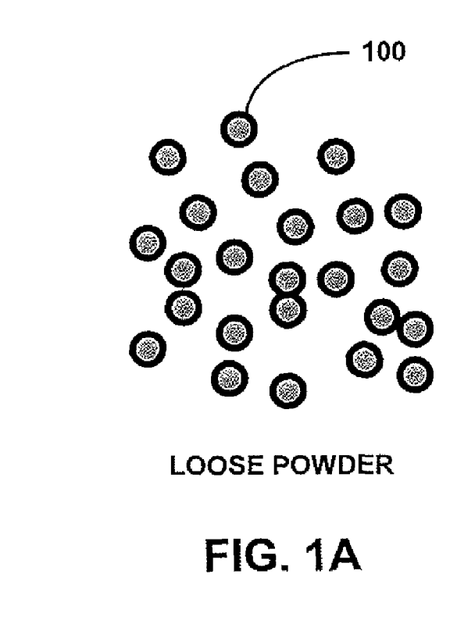
FIGS. 1A-1C illustrate consolidation of loose powders according to one embodiment.
Figure 1B:
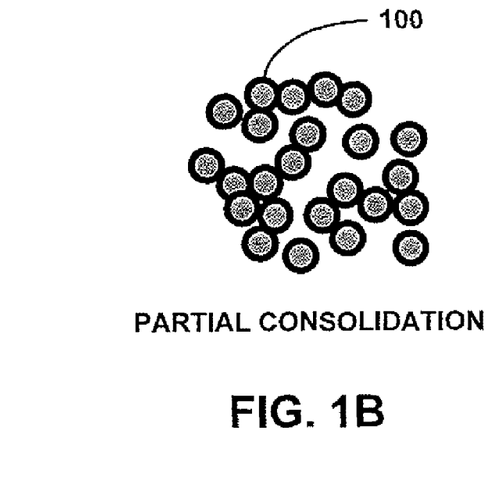
Figure 1C:
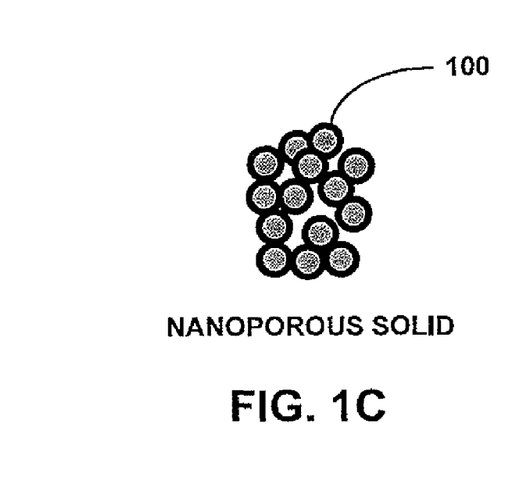

FIGS. 1A-1C describe how loose powders are consolidated in one approach. As shown in FIG. 1A, a loose nanoscale powder, e.g., comprising particles 100 of fuel or precursor, is collected. As depicted in FIG. 1B, the nanoscale powder is optionally partially consolidated. As depicted in FIG. 1C, the nanoscale powder is consolidated by compression to about the desired density under conditions that minimize grain/ligament growth of the particles. Note that some grain/ligament growth may be allowed to form a nanoporous solid. Methods for consolidation by compression are described below.

Figure 2A:
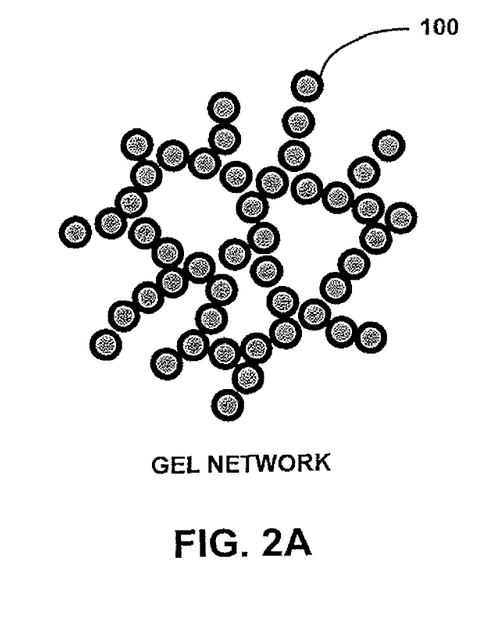
FIGS. 2A-2C illustrate an approach for consolidating a monolith according to one embodiment.
Figure 2B:
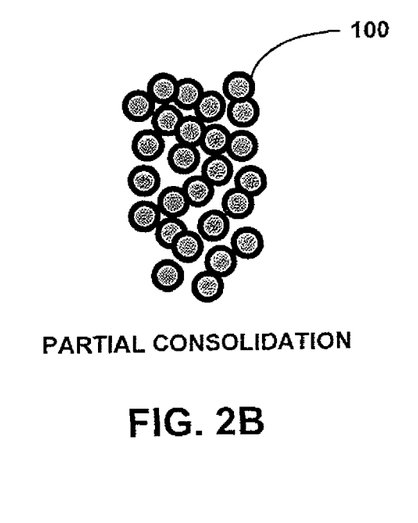
Figure 2C:
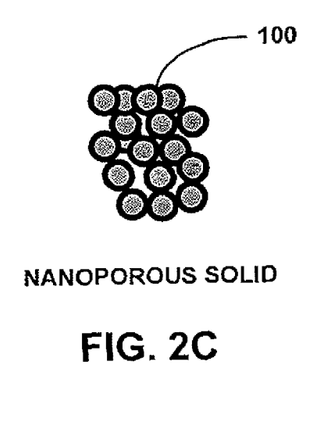

Referring next to FIGS. 2A-2C, there is shown an approach for consolidating a monolith. As shown in FIG. 2A, a gel network is formed, the gel network comprising particles 100 of nuclear fuel and/or a precursor thereof. Any suitable method for forming a gel network may be used. For example, the gel network may be formed by sol-gel processing, an example of which is described below. Whichever approach of forming the monolith is ultimately selected, it may be desirable to control the ligament size. Sol-gel processing provides good control over ligament length. As depicted in FIG. 2B, the monolith is optionally partially consolidated. As depicted in FIG. 2C, the monolith is consolidated by compaction to about the desired density. For example, the monolith may be compacted by compression to form a nanoporous solid. Methods for consolidation by compression are described below.

Figure 3A:
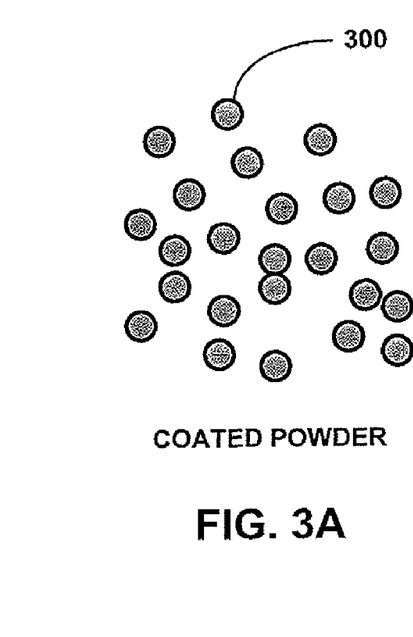
FIGS. 3A-3C illustrate an approach for compacting coated powders according to one embodiment.
Figure 3B:
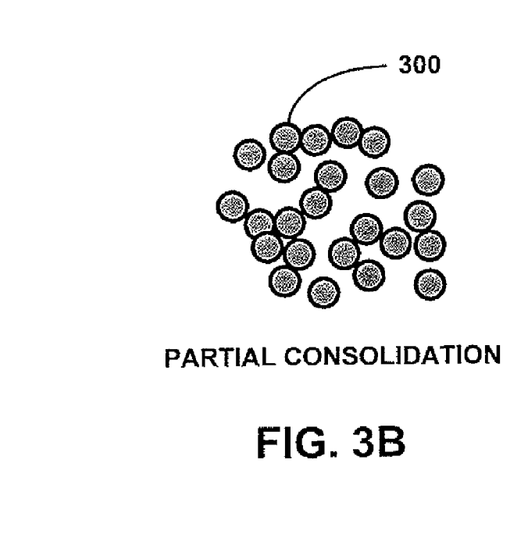
Figure 3C:
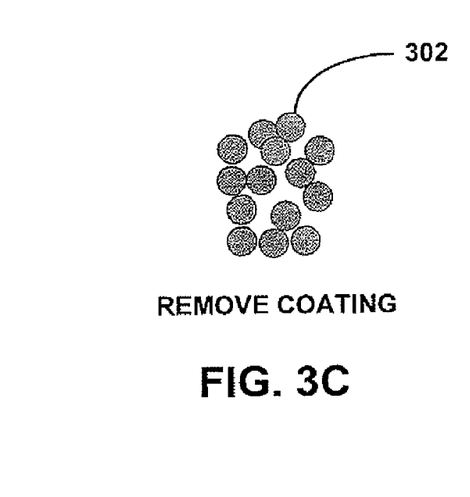

Referring next to FIGS. 3A-3C, there is shown an approach for compacting coated powders. As shown in FIG. 3A, a coated powder 300 is gathered, and optionally partially consolidated as shown in FIG. 3B. The coated powder comprises the nuclear fuel particles and/or a precursor thereof, along with a sacrificial coating. As depicted in FIG. 3C, the monolith is consolidated by compaction to about the desired density. For example, the monolith may be compacted by compression. Methods for consolidation by compression are described below. Then the coating is at least partially removed, thereby leaving an assembly of uncoated particles 302.

In a similar approach to that shown in FIGS. 3A-3C, a powder/porogen mixture may be formed and compacted. The porogen is then removed, thereby creating pores in the material.

Figure 4A:
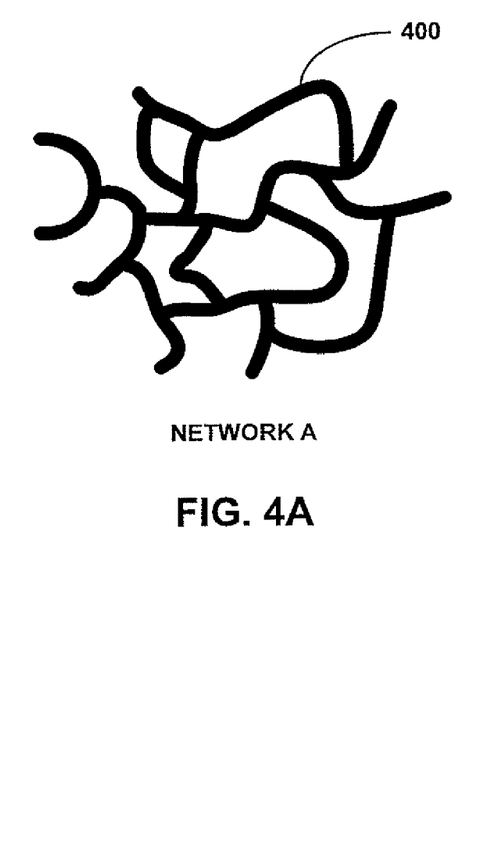
FIGS. 4A-4C illustrate an approach for forming a nuclear fuel using an interpenetrating network.
Figure 4B:
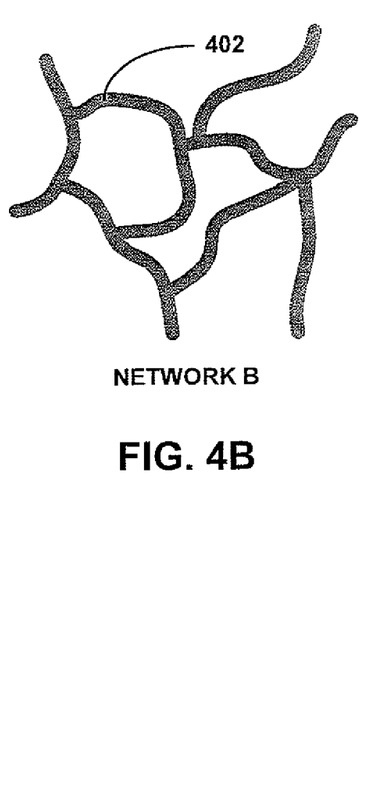
Figure 4C:
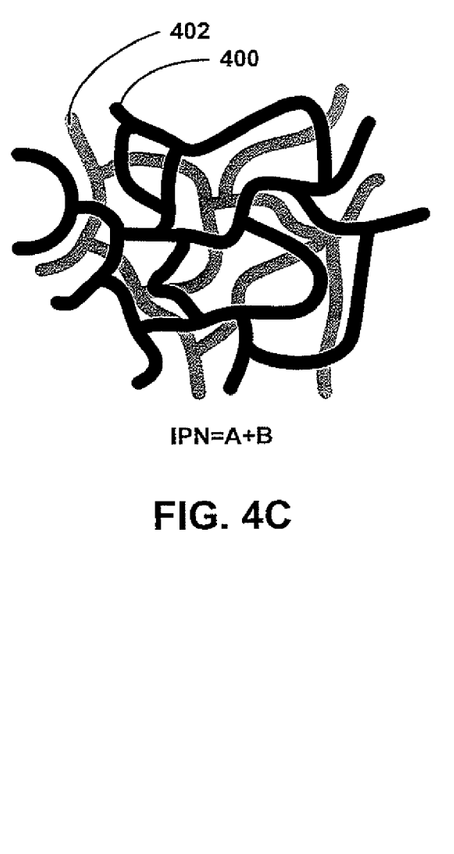

Referring next to FIGS. 4A-4C, there is shown an approach using an interpenetrating network (IPN). FIG. 4A depicts a first network 400 comprising nuclear fuel and/or a precursor thereof. FIG. 4B depicts a second network 402, which acts as a porogen. FIG. 4C depicts an IPN formed of the first and second networks 400, 402. Examples of IPN synthesis are presented below. The IPN may or may not be further consolidated, depending on its density. In many instances, the IPN is compacted. Then, the second network is removed using any appropriate process to generate final porosity. Differences between this approach and that described with reference to FIGS. 3A-3C is that this approach permits greater determination of distribution of the second phase, composition, and relative proportions of porogen/network. The IPN approach may also provide improved continuity of the pores.

In any of the approaches herein, where a precursor is used, further chemical processing may be performed to convert the precursor to a nuclear fuel. This can be accomplished at elevated temperatures and reduced oxygen levels in the presence of a reductant (e.g. hydrogen). For example, as mentioned above a precursor such as $U_3O_8$ may be reduced to the fuel, $UO_2$ by heating the $U_3O_8$ in an argon/hydrogen mixture at 700° C. The conditions are preferably chosen to minimize unwanted structural evolution.

Reduction may be performed after synthesis and/or consolidation.

Synthesis

Following are several methods of synthesizing the starting materials used in the creation of nuclear fuels. It should be noted that the following description is presented by way of example and is in no way meant to be limiting. Further, the various methods set forth below may be used in conjunction with the processes described above with reference to FIGS. 1A-4C, as well as any other embodiment or permutation described in or derived from the teachings herein. Of course, other methods of consolidation may also be used.

There are a number of ways to generate nanoscale building blocks of nuclear fuels, for example, oxide based fuels. Non-limiting examples of methods of synthesis include attrition of larger particles (e.g., high energy ball milling and sieving), nanoscale powders produced by flame spray pyrolysis, plasma spraying or related techniques, wet chemical or sol-gel processes, etc.

In order to address the problem of fuel swelling, however the starting materials are produced, they are preferably able to be consolidated to densities of about 68% of the TMD or greater (e.g., 66%, 70%, 72%, 75%, 80%, 90%, etc.), while maintaining continuous open nanoscale porosity and minimizing structural evolution and grain growth to the initial nanoscale ligament structure throughout the synthesis and consolidation (and, if necessary, reduction) processes. Examples of approaches to produce materials using sol-gel synthesis will be described below. However, one may readily substitute starting materials generated by different techniques into the process at the appropriate stage. Various consolidation approaches are also described later, and some of their advantages are noted. The production of materials meeting defined criteria may involve any or all of the steps described, or variations thereof comprising at least some different steps.

In further approaches, even lower densities may be employed, e.g., about 60% of the TMD or greater (e.g., 58%, 62%, 64%, 66%, 70%, 72%, 75%, 80%, 90%, etc.).

Sol-gel chemistry involves the reversible reactions of chemicals in solution to produce nanometer-sized primary particles, called "sols". The "sols" can be linked to form a three-dimensional solid network, called a "gel", with the remaining solution residing within the continuous open porosity of the resulting network. In one approach, reactive monomers are mixed into a solution of nuclear fuel particles. Polymerization then occurs leading to a highly cross-linked three- dimensional solid network resulting in a gel.

Solution chemistry determines the nanostructure morphology and composition, which in turn determine the material properties such as pore and primary particles sizes, gel time, surface areas, and density. When using sol-gel process one can readily achieve 1-100 nm ligaments by choice of the initial chemistry, aging, and processing (drying) conditions. Other ligament lengths are also achievable, Controlled evaporation of the liquid phase results in a moderately dense porous solid, often referred to as a "xerogel". Since these reactions are reversible, xerogel processing may be advantageous (along with aging) to evolve the primary or initial structure to afford larger length scale ligaments if necessary. Supercritical extraction (SCE) eliminates the surface tension and in so doing the capillary forces of the retreating liquid phase that collapse the pores. The results of SCE are highly porous, (less dense than xerogel) solids known as "aerogels". We have already demonstrated the feasibility of this technique to prepare uranium oxide aerogels with nanometer length scale ligaments. [See Satcher et al., J. Non-Cryst Solids 319, 241-246 (2003)] An alternative to the use of supercritical drying is the use of low surface tension solvents can also be used to retain this dimensionality on drying to produce a material typically know as an ambigel. [See Mansour et al., J. Electrochem. Soc., 150, 4, A403-A413, 2003] These three techniques are generally used to produce materials that are monolithic in nature, and ensure that a continuous open porosity has been maintained throughout the bulk of the material.

Stress may be applied during the extraction phase to increase the density of the resulting materials.

A typical gel structure is characteristically very uniform because the particles and the pores between them are on the nanometer size scale. Such homogeneity provides a uniformity of the material properties, which may be beneficial for present purposes.

By use of the sol-gel processing, materials can be made, for example, by solution addition, solution exchange, powder/particle addition, functionalized solid network, and functionalized particle network.

The methodologies of the above sol-gel manufacturing techniques are briefly described as follows:

Solution Addition: The nuclear fuel constituent is dissolved in a solvent which is compatible with the reactive monomer and mixed into the pre-gel solution prior to gelation. Upon gelation, the nuclear fuel constituent is uniformly distributed within the pores of the solid network formed by the polymerization of the reactive monomer.

Solution Exchange. After gelation, the liquid phase is exchanged with another liquid which contains a nuclear fuel constituent, thus allowing deposition of the nuclear fuel constituent within the gel.

Powder/Particle Addition: The nuclear fuel constituent, in particulate form, is either mixed with the pre-gel solution or added to a premade gel, resulting in a composite of gel and suspended particles.

Functionalized Solid Network: Use of reactive monomers which have functionalized sites dangling throughout the solid network after gelation. Dissolution of the nuclear fuel constituent in mutually compatible solvents and diffusing into the gel allows the nuclear fuel constituent to react and bind to the functionalized site. Thus, the amount of nuclear fuel constituent may be controlled by the number of functionalized sites while ensuring homogeneity at the molecular level.

Functionalized Particle Network: Functionalizing the nuclear fuel constituent molecules so that they can be reacted in solution to directly form a three dimensional solid (gel) which incorporates the nuclear fuel molecules at the finest scale. In this embodiment, the solid network is the nuclear fuel material and, if desired, the concentration can be controlled by co-reacting with other inert reactive monomers.

The use of composites to introduce sacrificial porogens or produce an interpenetrating network (IPN) may also be used to define pore size, distribution, and interconnectivity in the final material.

Techniques such as freeze-drying, spray-drying, or distillation may be used to remove the initial solvent in a fashion that avoids nanoparticle agglomeration. Thus, powders with dimensions representative of the primary particle dimensions, composition, or distribution of phases (e.g. IPNs) of bulk materials from the sol-gel process can be produced for consolidation.

The use of sacrificial porogens to assist in retaining porosity and facilitate consolidation, e.g. carbon or polyethyleneglycol (PEG) is known. While this methodology has potential, the likelihood of closed porosity formation is high. Therefore, more preferred is the preparation of an IPN of ceramic, nuclear fuel or precursor thereof, and organic polymer. Methodology for creating such IPN is found in U.S. Pat. No. 6,712,917 to Gash et al., which is herein incorporated by reference. The IPN is then consolidated at low temperatures, followed by removal of one of the phases, in this case the organic polymer (organic/inorganic). In another approach, one may also produce an IPN, consolidate the composite, then oxidatively remove/burn out the organic phase below the sintering temperature. Plasma etching may also be used to remove the organic phase (e.g., in an IPN) to generate final porosity. In addition to occupying physical space, the polymer acts as a lubricant to assist consolidation. In yet another approach, the use of an epoxide method to generate oligimers as IPN/scaffold coating may afford the simplest approach to IPN formation. [See, e.g., Cash et al., Chem. Mater. V13, 2001, p 999]

Inorganic/inorganic systems may also be used in some approaches. In the case of an inorganic/inorganic system one may chemically etch one phase selectively as in the example of using an HCl etch to selectively remove $TiO_2$ from a $SiO_2$/$TiO_2$ mix to create gradient index materials.

In embodiments which use a fluid component during the synthesis phase, where present, the fluid may be removed in a fashion that avoids agglomeration.

Consolidation

Following are several methods of consolidating materials used during the creation of nuclear fuels. It should be noted that the following description is presented by way of example and is in no way meant to be limiting. Further, the various methods set forth below may be used in conjunction with the processes described above with reference to FIGS. 1A-4C, as well as any other embodiment or permutation described in or derived from the teachings herein. Of course, other methods of consolidation may also be used.

Consolidation to about the desired density can be achieved by various techniques or a combination of techniques.

One approach to consolidation includes the direct compression of a monolithic material produced as described above. Alternatively nanoscale powders produced may be directly consolidated or slip cast then consolidated to intermediate density porous materials. One illustrative approach would utilize isostatic pressing as a first step. Isostatic pressing is used for compressing powdered and other materials into shaped pre-forms or general products. There are two main types of isostatic presses: cold isostatic presses (CIP) that function at room temperature and hot isostatic presses (HIP) that function at elevated temperatures.

Cold isostatic pressing applies pressure from multiple directions for achieving greater uniformity of compaction (high-quality parts) and increased shape capability, compared to uniaxial pressing. For example, cold isostatic pressing comprises compacting a material into a predetermined shape by the application of pressure via a fluid through a flexible mold. This technique has many advantages over uniaxial pressing e.g., high green density and strength, fabrication of complicated parts, green machinery, etc. This method is widely used for advanced ceramics, generally for high-performance applications and can typically consolidate to densities of approximately 40-50% of TMD, making it particularly useful for partial consolidation.

To get to about 68% or more of the TMD, conventional hot pressing at well below sintering temp may be used.

Compression may also be performed using a relatively new sintering technique known as Spark Plasma Sintering (SPS). SPS is also known as Field Assisted Sintering Technique (FAST) or Pulsed Electric Current Sintering (PECS). A main characteristic of the SPS process in one approach is that the pulsed DC current directly passes through a graphite die, as well as the powder compact (comprising nuclear fuel particles or precursor thereof), in the case of conductive samples. Therefore, the heat is generated internally, in contrast to the conventional hot pressing, where the heat is provided by external heating elements. This facilitates a very high heating or cooling rate (up to 600K/min), hence the entire process generally is very fast, possibly being completed within a few minutes. The general speed of the process ensures it has the potential of densifying powders with nanosize or nanostructure while avoiding coarsening that accompanies standard densification routes. Whether plasma is generated has not been confirmed yet, especially when non-conductive powders are compacted. It has been reported that densification is enhanced by the use of a pulsed DC current or field. One could effectively use the current or plasma assist to "weld" particles together to enhance mechanical properties of the final piece. The feasibility of sintering nanoscale powders without significant grain growth has been successfully demonstrated. For example, SPS has been shown to produce nanocrystalline $ZrO_2$ materials while maintaining nanogram size. [See Munir: J. Mat. Res. V19, N11, 2004, p 3255.] At least one of the inventors has also observed compaction of sol-gel derived amorphous tungsten oxide materials starting at temperatures as low as 200° C. (at 300 MPa), well below the melting point of the oxide. An additional advantage of SPS over conventional hot pressing is the rapidity of heating so that materials need not dwell at elevated temperatures for prolonged periods, thus minimizing viscous flow and grain growth. The SPS process is generally operated at low $O_2$ partial pressure, and by using graphite dies, a reducing environment is maintained. This is particularly advantageous in this application when used with a precursor of an oxide-based nuclear fuel, since it can contribute to the reduction of the precursor (e.g., $UO_3$ or $U_3O_8$ to $UO_2$ or at minimum, preclude oxidation during consolidation. If material other than the nuclear fuel, e.g., $UO_2$, is used for consolidation, a subsequent reduction may be required. Again, this can be accomplished at elevated temperatures and reduced oxygen levels in the presence of a reductant (e.g. hydrogen). The conditions are preferably chosen to minimize unwanted structural evolution.

In Use

The nuclear fuel may be encased in cladding, thereby forming a fuel rod. Aluminum, stainless steel, and zirconium alloys are illustrative cladding materials. As noted above, the porosity of the material minimizes or eliminates expansion of the nuclear fuel, thereby allowing the material to abut the inner surface of the cladding.

The finished fuel rods may be grouped in special fuel assemblies that may then be used to build up the nuclear fuel core of a power reactor. For the most common types of reactors, the tubes may be assembled into bundles with the tubes spaced precise distances apart. These bundles may also be given a unique identification number, which enables them to be tracked from manufacture through use and into disposal.

As alluded to above, the nuclear fuel may be used in a nuclear reactor such as a LWR or other type. Those skilled in the art will have an understanding of the chemistry and physics of the various types of nuclear reactors and how nuclear fuel is used therewith, and therefore only a brief description is provided below.

A nuclear reactor is a device in which nuclear chain reactions are initiated, controlled, and sustained at a steady rate. The most significant use of nuclear reactors is as an energy source for the generation of electrical power and for the power in some ships (e.g., nuclear marine propulsion). This is usually accomplished by methods that involve using heat from the nuclear reaction to power steam turbines.

For a nuclear power plant, the heat is provided by nuclear fission inside the nuclear reactor. When a relatively large fissile atomic nucleus (e.g., $^{235}$U or $^{239}$Pu) is struck by a neutron it forms two or more smaller nuclei as fission products, releasing energy and neutrons in a process called nuclear fission. The neutrons then trigger further fission. When this nuclear chain reaction is controlled, the energy released can be used to heat water, produce steam and drive a turbine that generates electricity.

A light water reactor or LWR is a thermal nuclear reactor that uses ordinary water, also called light water, as its neutron moderator. This differentiates it from a heavy water reactor, which uses heavy water as a neutron moderator. In practice all LWRs are also water cooled. While ordinary water has some heavy water molecules in it, their concentration is not enough to be important in most applications.

The most common LWRs are pressurized water reactors and boiling water reactors.

Many other reactors are also (light) water cooled, notably the RBMK and some military plutonium production reactors. These are not regarded as LWRs, as they are moderated by graphite, and as a result their nuclear characteristics are very different.

Most light-water reactors use uranium 235 as a fuel, enriched to approximately 3 percent. Although this is its major fuel, the uranium 238 atoms also contribute to the fission process by converting to plutonium 239—about one-half of which is consumed in the reactor. Light-water reactors are generally refueled every 12 to 18 months, at which time, about 25 percent of the fuel is replaced.

Light water reactors tend to be simpler and cheaper to build than heavy water reactors. Power-generating capabilities are comparable.

Light water reactors are the type used by the U.S. military in its Naval nuclear powered vessels. This is so due to the inherent safety of these type reactors. Since light water is used as both a coolant and a moderator in these reactors, if one of these reactors suffers damage due to attack, and thereby compromise of the reactor core's integrity, the ensuing release of this light water acts to shut down the reactor. Moderators help to encourage the nuclear mass to achieve fission by lowering the average speed of the neutrons to a level which augments the probability of occurrence of neutron-Uranium collisions susceptible to lead to a Uranium nucleus fission. When the moderator is removed, the average energy of the neutrons becomes too high for the chain reaction to sustain itself. Currently-offered LWRs include the ABWR, AP1000, ESBWR, European Pressurized Reactor, VVER and SWR-1000.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A nuclear fuel, comprising:
an assembly of nuclear fuel particles;
nano-scale ligaments extending between the nuclear fuel particles; and
continuous open channels defined between at least some of the nuclear fuel particles and between the ligaments,
wherein the channels are structurally characterized as being capable of allowing fission gasses produced in an interior of the assembly to escape from the interior of the assembly to an exterior thereof without causing swelling of the assembly,
wherein the assembly has a density of at least about 68% of a theoretical maximum density thereof.

2. The nuclear fuel of claim 1, wherein the fuel particles are unsintered.

3. The nuclear fuel of claim 1, wherein the assembly has a density of between about 68% and 80% of a theoretical maximum density thereof.

4. The nuclear fuel of claim 1, wherein the assembly is a compressed aerogel, xerogel, or ambigel.

5. The nuclear fuel of claim 1, wherein the nuclear fuel is characterized as being usable in a nuclear reactor as a fuel that does not impart mechanical loading on cladding materials cladding the nuclear fuel.

6. The nuclear fuel of claim 1, wherein the nano-scale ligaments are formed at least in part of the nuclear fuel particles.

7. The nuclear fuel of claim 1, wherein the nano-scale ligaments have a length in a range of about 0.1 nanometer to about 1000 microns.

8. The nuclear fuel of claim 7, wherein the nano-scale ligaments have a length in a range of about 1 nanometer to about 10 nanometers.

9. The nuclear fuel of claim 7, wherein the nano-scale ligaments have a length in a range of about 5±2 nanometers to about 10±2 nanometers.

10. The nuclear fuel of claim 1, wherein the nuclear fuel particles are comprised of $UO_2$.

11. The nuclear fuel of claim 10, wherein the nuclear fuel particles consist of $UO_2$.

12. The nuclear fuel of claim 7, further comprising cladding encasing the assembly of fuel particles, wherein the fuel particles in the cladding are unsintered, wherein the assembly has a density of between about 68% and 80% of a theoretical maximum density thereof.

13. The nuclear fuel of claim 8, wherein the nano-scale ligaments have a length in a range of about 1 nanometer to about 10 nanometers.

14. The nuclear fuel of claim 2, further comprising cladding encasing the unsintered fuel particles.

15. A method for fabricating a nuclear fuel, comprising:
consolidating a precursor of a nuclear fuel to produce an open nanoscale porosity material having a density of at least about 68% of a theoretical maximum density of the material,
the material comprising:
an assembly of nuclear fuel particles;
nano-scale ligaments extending between the nuclear fuel particles; and
continuous open channels defined between at least some of the nuclear fuel particles and between the ligaments,
wherein the channels are structurally characterized as being capable of allowing fission gasses produced in an interior of the assembly to escape from the interior of the assembly to an exterior thereof without causing swelling of the assembly,
wherein the assembly has a density of at least about 68% of a theoretical maximum density thereof.

16. The method of claim 15, wherein the assembly of fuel particles comprises nano-scale ligaments.

17. The method of claim 15, wherein the structure is a compressed aerogel, xerogel, or ambigel.

18. The method of claim 15, further comprising reducing the precursor to a nuclear fuel.

19. The method of claim 18, wherein the material, after reduction, maintains about the same overall volume, defined by an outer periphery thereof, during a nuclear fission chain reaction involving the nuclear fuel thereof.

20. The method of claim 15, further comprising synthesizing the precursor of the nuclear fuel.

21. The method of claim 15, wherein the precursor is consolidated by at least one of direct compression, isostatic pressing and spark plasma sintering.

* * * * *